United States Patent
Marcjan et al.

(10) Patent No.: US 7,693,918 B2
(45) Date of Patent: Apr. 6, 2010

(54) RAPID PROTOTYPING, GENERATING AND DYNAMICALLY MODIFYING A SCHEMA REPRESENTING A DATABASE

(75) Inventors: Cezary Marcjan, Redmond, WA (US);
Ryszard K. Kott, Redmond, WA (US);
Andrzej Turski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1214 days.

(21) Appl. No.: 11/091,053

(22) Filed: Mar. 28, 2005

(65) Prior Publication Data
US 2006/0218163 A1    Sep. 28, 2006

(51) Int. Cl.
*G06F 7/00* (2006.01)

(52) U.S. Cl. .................. 707/804; 707/807

(58) Field of Classification Search ............ 707/1, 707/100–104.1, 200, 803, 804, 807; 717/111
See application file for complete search history.

(56) References Cited

U.S. PATENT DOCUMENTS

| | | | | |
|---|---|---|---|---|
| 5,375,237 A | * | 12/1994 | Tanaka et al. | 707/102 |
| 5,499,371 A | * | 3/1996 | Henninger et al. | 717/108 |
| 5,572,733 A | * | 11/1996 | Ryu et al. | 717/104 |
| 5,717,924 A | * | 2/1998 | Kawai | 707/102 |
| 5,809,297 A | * | 9/1998 | Kroenke et al. | 707/102 |
| 5,819,086 A | * | 10/1998 | Kroenke | 707/102 |
| 5,838,965 A | * | 11/1998 | Kavanagh et al. | 707/103 R |
| 6,012,067 A | * | 1/2000 | Sarkar | 707/103 R |
| 6,061,726 A | * | 5/2000 | Cook et al. | 709/226 |
| 6,282,546 B1 | * | 8/2001 | Gleichauf et al. | 707/102 |
| 6,317,748 B1 | * | 11/2001 | Menzies et al. | 707/103 X |
| 6,460,052 B1 | * | 10/2002 | Thomas et al. | 707/203 |
| 6,728,768 B1 | * | 4/2004 | Carney | 709/224 |
| 6,876,314 B1 | * | 4/2005 | Lin | 341/50 |
| 6,963,880 B1 | * | 11/2005 | Pingte et al. | 707/103 R |

* cited by examiner

*Primary Examiner*—Miranda Le
(74) *Attorney, Agent, or Firm*—Lee & Hayes, PLLC

(57) ABSTRACT

A system and method for generating a schema for a database is provided. The schema is based, at least in part, upon three main tables: object types, objects, and, associations. Through these three base tables, the system facilitates rapid prototyping of schema associated with database(s). The schema is extensible since associations between objects, objects and object types are not hard-coded and can be dynamically updated by modifying the appropriate entry(ies) in one or more of these three base tables. Thus, through these three tables, an extensible, flexible framework for generating and/or dynamically modifying the schema is provided.

The system includes an input component that receives information associated with a requested database prototype. The system further includes a schema generation component that generates a schema based, at least in part, upon the information received by the input component.

18 Claims, 7 Drawing Sheets

RAPID PROTOTYPING, GENERATING AND DYNAMICALLY MODIFYING A SCHEMA REPRESENTING A DATABASE

TECHNICAL FIELD

The subject invention relates generally to computer system(s), and more particularly, to a generic schema that facilitates rapid prototyping of database(s).

BACKGROUND OF THE INVENTION

During conventional database prototyping, the structure of a database schema can frequently change due, for example, to changing requirement(s) and/or programming difficulties. Updating a hard-coded schema can be hard and infeasible especially when the compatibility with prior versions is required in a rapid prototyping environment and especially when a product or a prototype is already deployed. Often it requires writing special software for upgrading the database which is a source of potential errors and defies the requirements of rapid prototyping.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides a system and method for generating a schema for a database. The schema is based, at least in part, upon three main tables: object types, objects, and, associations. Through these three tables, an extensible, flexible framework for generating and/or dynamically modifying the database schema is provided.

The system can facilitate association(s) between various objects (e.g., documents, people, message etc.) with which user(s) interact. For example, the system can generate a schema that provides information regarding a list of associated objects to a given known object (e.g., a list of relevant documents, contacts, meetings, etc. generated for a selected document (e.g., in real time)). In accordance with aspects of the subject invention, other scenarios can be derived from this basic one—having the same main characteristic: use of object associations.

The system can be used, for example, in conjunction with a file system database. Extraction of associations and their evaluations can be done by a file system engine (e.g., in triggers and/or stored procedures).

The system includes an input component that receives information associated with a requested database prototype. The system further includes a schema generation component that generates a schema based, at least in part, upon the information received by the input component.

The schema generated by the schema generation component is based on three base tables: associations, objects, and, object types. Through these three base tables, the system facilitates rapid prototyping of schema associated with database(s). The schema is extensible since associations between objects, objects and object types are not hard-coded and can be dynamically updated by modifying the appropriate entry(ies) in one or more of these three base tables.

The entries of the associations table are type independent to support "linking" of objects of different types. For example, this can be is implemented by assigning a unique ID (e.g., integer) to each object (e.g., document, person, web site, etc.) and storing it in the objects table which is the second central table of the system. Objects table entries identify an object and includes an object identifier and a type identifier.

Entry(ies) of the associations table associate two objects with a third object (associating object). The two objects and the associating object are entities existing in the objects table. The associations entry also includes an association identifier which uniquely identifies the association between the two objects via associating object.

Object types table entries describe object types. An object type can include a type identifier, a name, and a description. The type identifier can be identified in a particular object table entry. Exemplary object types include an association, a person, a file, an email, an application, a web page, a folder, an event, a raw event, a group type, a group and/or an email server.

During prototyping, the schema generation component can be employed to generate and/or dynamically modify the schema of the database. Additionally, in addition to the three base tables (associations table, objects table and object types table), the schema generation component can generate/populate additional table(s).

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
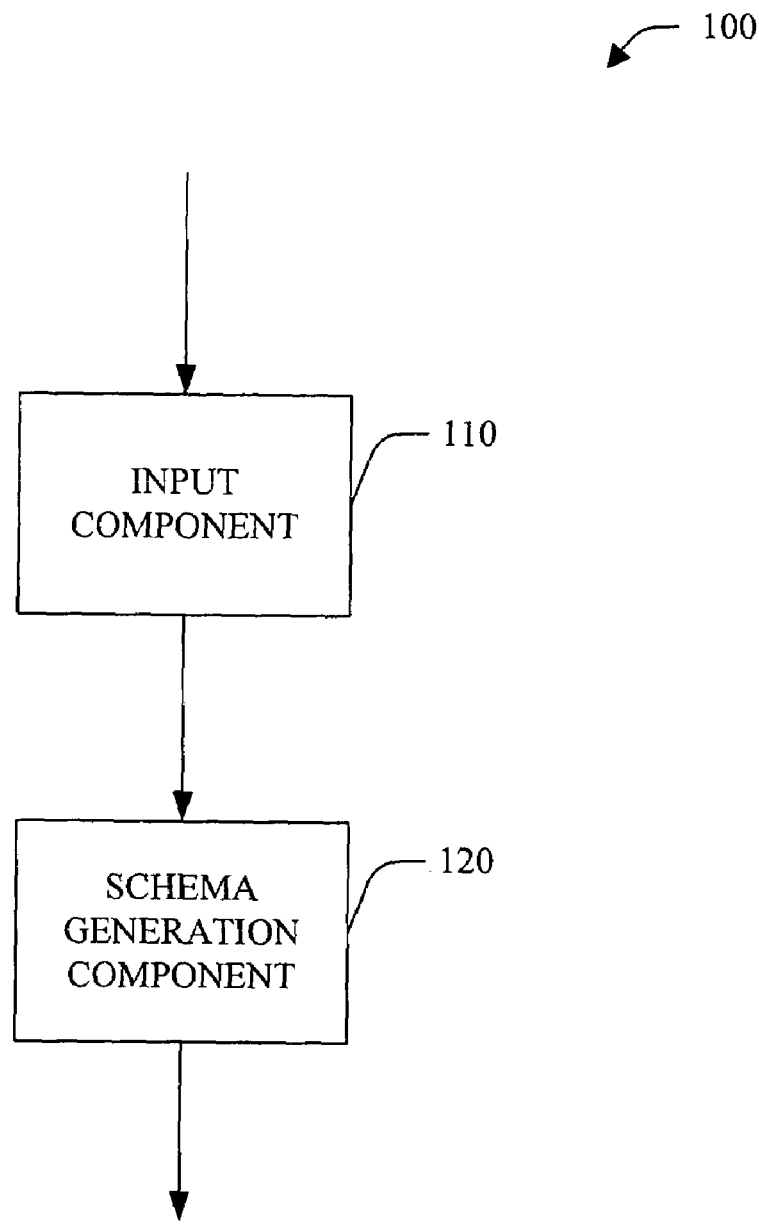
FIG. 1 is a block diagram of a schema generation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with one or more data packets (e.g., data from one component interacting with another component in a local system, distributed system, and/or across a network such as the Internet with other systems). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

Referring to FIG. 1, a schema generation system 100 in accordance with an aspect of the subject invention is illustrated. The system 100 can be employed to generate a schema for a database (not shown).

The system 100 can facilitate association(s) between various objects (e.g., documents, people, message etc.) with which user(s) interact. For example, it is very efficient for people to remember things and events by associating them with other information. For example:

"I was working on the document A around the time when I was working on the documents B and C".

"I was working on the document D the day it was sunny sometime in February".

"I found this excellent web site when I was reading about E".

In one example, the system 100 can generate a schema that provides information regarding a list of objects associated with a given known object. For example a list of relevant documents, contacts, meetings, etc. is generated for a selected document (e.g., in real time). In accordance with aspects of the subject invention, other scenarios can be derived from this basic one—having the same main characteristic: the user of object associations.

The system 100 can be used, for example, in conjunction with a file system database. Extraction of associations and their evaluations can be done by a file system engine (e.g., in triggers and/or stored procedures). The system 100 can thus reduce the need for manual filing and maintenance of the information store structure (e.g., documents in the file system, email messages in the email folders, etc.) and the need for memorizing locations of this information (this includes maintenance of various links that get broken with time). The design also helps in minimizing the need and importance of searching and browsing, very common tasks of everyday computer user. These ways of locating information are common even when users search for their own documents and contacts on their own machines.

The system 100 includes an input component 110 that receives information associated with a requested database prototype. The system 100 further includes a schema generation component 120 that generates a schema based, at least in part, upon the information received by the input component 110.

Figure 2:
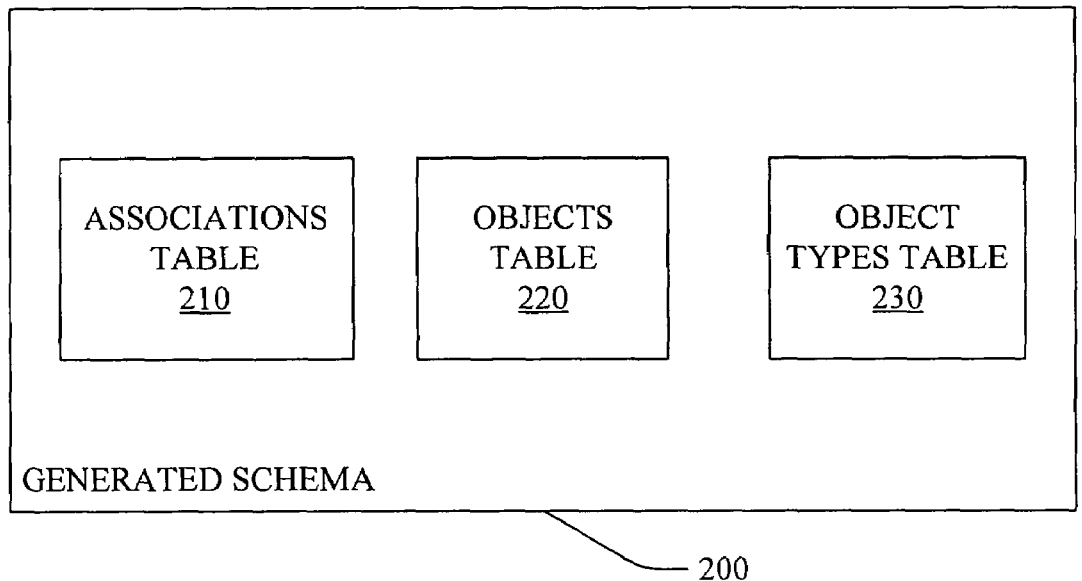
FIG. 2 is a diagram of an exemplary schema generated by the schema generation component in accordance with an aspect of the subject invention.

Referring briefly to FIG. 2, the schema 200 generated by the schema generation component 120 is based on three base tables: associations 210, objects 220, and, object types 230. Through these three base tables, the system 100 facilitates rapid prototyping of database(s). The schema is extensible since associations between objects, objects and object types are not hard-coded and can be dynamically updated by modifying the appropriate entry(ies) in one or more of these three base tables.

Since the system 100 relies heavily on associations, one of the central points of the schema is the associations table 210. The entries of the associations table 210 are type independent to support "linking" of objects of different types. For example, this can be is implemented by assigning a unique ID (e.g., integer) to each object (e.g., document, person, web site, etc.) and storing it in the objects table 220 which is the second central table of the system.

Figure 3:
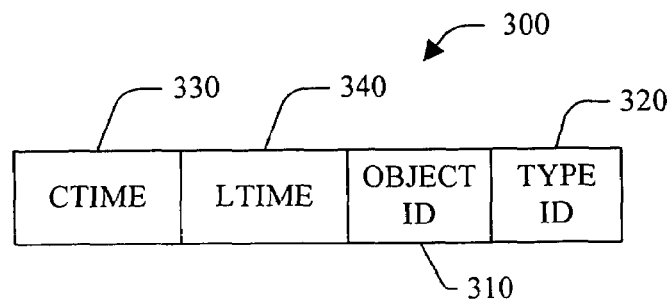
FIG. 3 is a diagram of an exemplary objects table entry in accordance with an aspect of the subject invention.

Referring briefly to FIG. 3, an exemplary objects table entry 300 in accordance with an aspect of the subject invention is illustrated. The objects table entry 300 (e.g., rows in the objects table 220) identifies an object and includes an object identifier 310 and a type identifier 320. The objects table entry 300 can further include a ctime entry 330 which provides a creation time of the object, and, a time entry 340 which provides a last usage time of the object.

Figure 4:
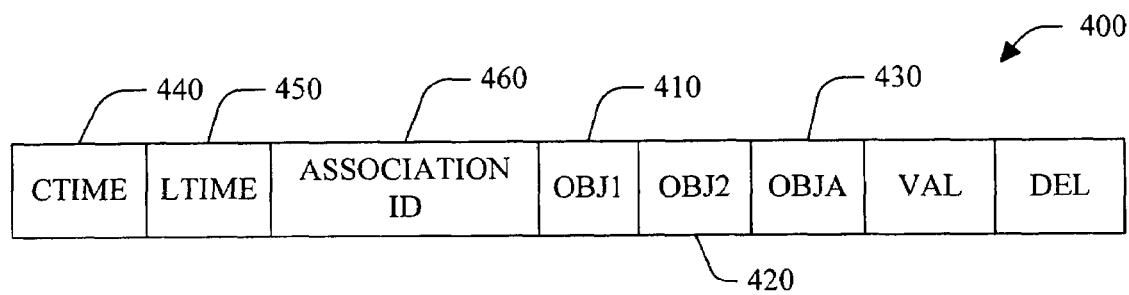
FIG. 4 is a diagram of an exemplary associations table entry in accordance with an aspect of the subject invention.

Turning to FIG. 4 an exemplary associations table entry 400 in accordance with an aspect of the subject invention is illustrated. The associations entry 400 (e.g., rows in the associations table 210) associates two objects: obj1 410 and obj2 420 with a third object referred to herein as an associating object, objA 430. The values of these objects 410, 420, 430 can be object identifiers (e.g., object identifiers 310) of respective objects stored in the objects table 220. The associations entry 400 can further include a ctime entry 440 which provides a creation time of the association entry 400, and, a ltime entry 440 which provides a last usage time of the association entry 400. The associations entry 400 also includes an association identifier 460 which uniquely identifies the association between obj1 410 and obj2 420 via associating object objA 430.

In this example, the associated objects obj1 410 and obj2 420 and the associating object objA 430 can be of any type but instances of each must exist, that is, entries in the objects table 220 with the specified object identifier must exist. If an object is deleted, then the associations of this object are also deleted (e.g., all entries of the associations table 210 for which the object identifiers obj1 410 and/or obj2 are equal to the object identifier of the deleted object are deleted).

If the associating object identifier, objA 430, references the deleted object then the association is not deleted but the identifier value of objA 430 is changed to a predefined identifier of a static null object of the same type. In this example, there is one instance of a null object of each type. Identifier(s)

of null objects are equal to identifier(s) of object types from the object types table 230, as described below.

The ctime entry 330, ctime entry 440, ltime entry 340 and/or the ltime entry 450 can be employed in evaluations of objects and associations related to time durations and time decay.

Figure 5:
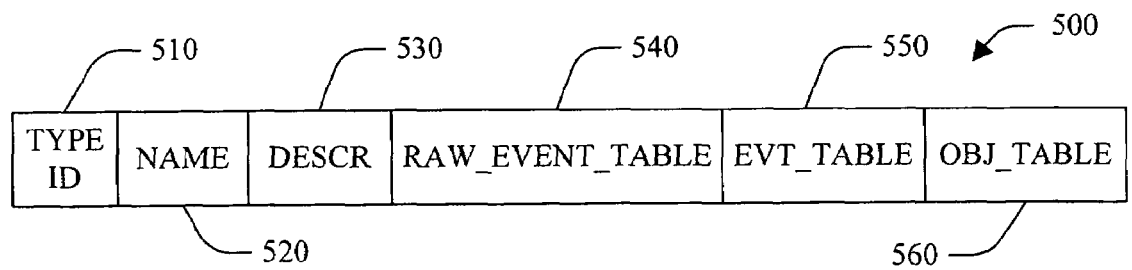
FIG. 5 is a diagram of an exemplary object types entry in accordance with an aspect of the subject invention.

Next, referring to FIG. 5, an exemplary object types entry 500 in accordance with an aspect of the subject invention is illustrated. The object types entry 500 (e.g., rows in the object types table 230) describes object types. In this example, object type is identified by a type identifier 510, a name 520, a description 530, and, optionally, three data table names, raw_event_table 540, evt_table 550, and, obj_table 560. The type identifier 510 can be a type identifier 320 identified in a particular object table entry 300.

The raw_event_table 540 specifies a name of a table that stores raw event(s) for this type of object. Raw events are collected events that do not reference any existing object in the objects table 220. This table can be treated as a temporary table for deriving object events and object instances. The evt_table 550 contains entries that reference existing objects of this type. The obj_table 560 specifies a table name of the table that contains objects of this type.

Exemplary object types table entries include:

TABLE 1

| type id | Name | descr | raw_evt_table | evt_table | obj_table |
|---|---|---|---|---|---|
| 0 | Type | Represents object type | NULL | NULL | ObjectTypes |
| 1 | Association | Association object used for associating two other objects | NULL | NULL | AssocInfo |
| 1000 | Person | Representation of a person | NULL | NULL | People |
| 1001 | File | File (local, remove, or on removable media) | FileRawEvents | FileEvents | Files |
| 1002 | Email | EMail message | EmailRawEvents | EmailEvents | EmailMessages |
| 1003 | Application | Application instance | ApplicationRawEvents | Application Events | Applications |
| 1004 | WebPage | Web page | WebpageRawEvents | Webpage Events | Webpages |
| 1005 | Folder | Folder (local, remote, or on removable media) | FolderRawEvents | FolderEvents | Folders |
| 1006 | Event | Represents event | NULL | NULL | NULL |
| 1007 | RawEvent | Represents raw event | NULL | NULL | NULL |
| 1008 | GroupType | Represents group type object | NULL | NULL | NULL |
| 1009 | Group | Represents group object | NULL | NULL | NULL |
| 1010 | EmailServer | Represents email server | NULL | NULL | EmailServers |

In this example, an object table of each type (if specified) contains columns that are specific to the object type. For example, email messages can have different data columns than folders. Further, in this example, object tables (obj_table) for each type are required to have an object identifier column that references existing objects in the objects table 220.

In the associations table 210, the associating object, objA430, is sometimes referred to as association type if its ID represents a "static" predefined object (e.g., not an instance of a dynamically created object). Continuing with the example of Table 1, an exemplary predefined association (e.g., AssocInfo) includes:

TABLE 2

| associd | assocname | assocdescr |
|---|---|---|
| 2000 | Container | object1 contains object2 |
| 2001 | Property | object2 is a property of object1 |
| 2002 | Derived | object1 is derived from object2 |
| 2003 ... 2009 | Reserved | reserved |

TABLE 2-continued

| associd | assocname | assocdescr |
|---|---|---|
| 2010 | Time co-occurrence | object1 and object2 co-occurred in time |
| 2011 | co-location | object1 and object2 are co-located |
| 2012 | Application | object1 is application for object2 |
| 2013 | UI switch | there was an UI switch from object1 to object2 |
| 2014 | Move | object2 is a copy of object1, object1 was deleted |
| 2015 | Copy | object2 is a copy of object1 |
| 2016 | copy/paste | there was a copy/paste operation between object1 and object2 |
| 2017 | Userassoc | the user specified association between two objects |
| 2018 | Messagefrom | object1 is sender of email message object2 |
| 2019 | Messageto | object1 is recipient of email message object2 |
| 2020 | Messagecc | object1 cc recipient of email message object2 |
| 2021 | Conversation | object1 is follow up conversation to object2 |
| 2022 ... 2099 | Reserved | reserved |

In this example, when a new type of association is created (e.g., NOT an association instance between objects) an entry in the AssocInfo table (Table 2) is added together with an instance of "Association" object in the Objects table 220 in the "reserved" space for the same object ID as the association ID (associd). For this reason, in this example, entries of the objects table 220 for the object IDs from 2000 to 2099 are of type "1" (e.g., object of type "Association"—from object types table 230).

During prototyping, the schema generation component 120 can be employed to generate and/or dynamically modify the schema of the database.

Figure 6:
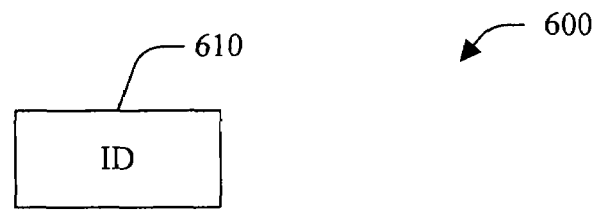
FIG. 6 is a diagram of an exemplary people table entry in accordance with an aspect of the subject invention.

As noted previously, in addition to the three base tables (associations table 210, objects table 220 and object types table 230), the schema generation component 120 can populate additional table(s). Referring next to FIG. 6, an exemplary people table entry 600 in accordance with an aspect of the subject invention is illustrated. In this example, the people table contains identifiers 610 of persons. These identifiers 610 are object identifiers in the objects table 220.

Figure 7:
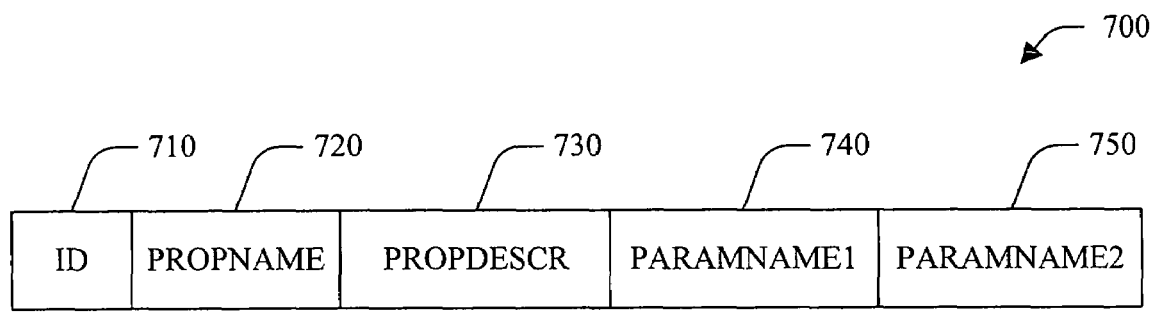
FIG. 7 is a diagram of an exemplary PersonPropertyTypes table entry in accordance with an aspect of the subject invention.

Continuing with this example, each person can additionally have a set of predefined properties of different types. The property types are stored in the PersonPropertyTypes table. Turning to FIG. 7, an exemplary PersonPropertyTypes table entry 700 in accordance with an aspect of the subject invention is illustrated. In one example, the following property types predefined:

TABLE 3

| propname | propdescr |
|---|---|
| 'DisplayName' | NULL |
| 'FirstName' | 'Persons first name' |
| 'LastName' | 'Persons last name' |
| 'MiddleName' | 'Persons middle name' |
| 'Nickname' | 'Persons nickname name' |
| 'EmailAddr' | 'EmailType' |
| 'Age' | NULL |
| 'AddrCity' | NULL |
| 'AddrState' | NULL |
| 'AddrCountry' | NULL |
| 'AddrStreetName' | NULL |
| 'AddrHouseNumber' | NULL |
| 'AddrZipCode' | NULL |
| 'OfficeBuilding' | NULL |
| 'OfficeNumber' | NULL |
| 'DLMemberOf' | NULL |
| 'DLOwner' | 'DLDispName' |

Figure 8:
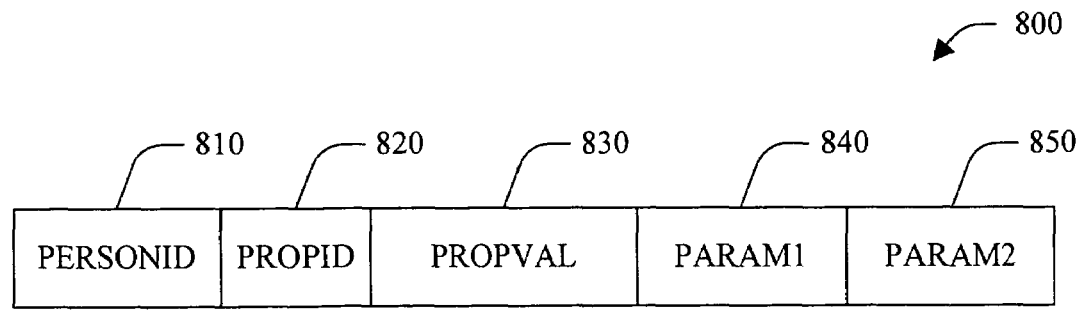
FIG. 8 is a diagram of an exemplary PersonProperties table entry in accordance with an aspect of the subject invention.

In this example, properties of each person are stored in a PersonProperties table. In accordance with an aspect of the subject invention, an exemplary PersonProperties table entry 800 is illustrated in FIG. 8. The PersonProperties table entry 800 includes a person identifier 810, a property identifier 820, a property value 830, a first parameter 840, and, a second parameter 850. During prototyping, these properties can be modified, deleted and/or added to dynamically through the system 100.

Figure 9:
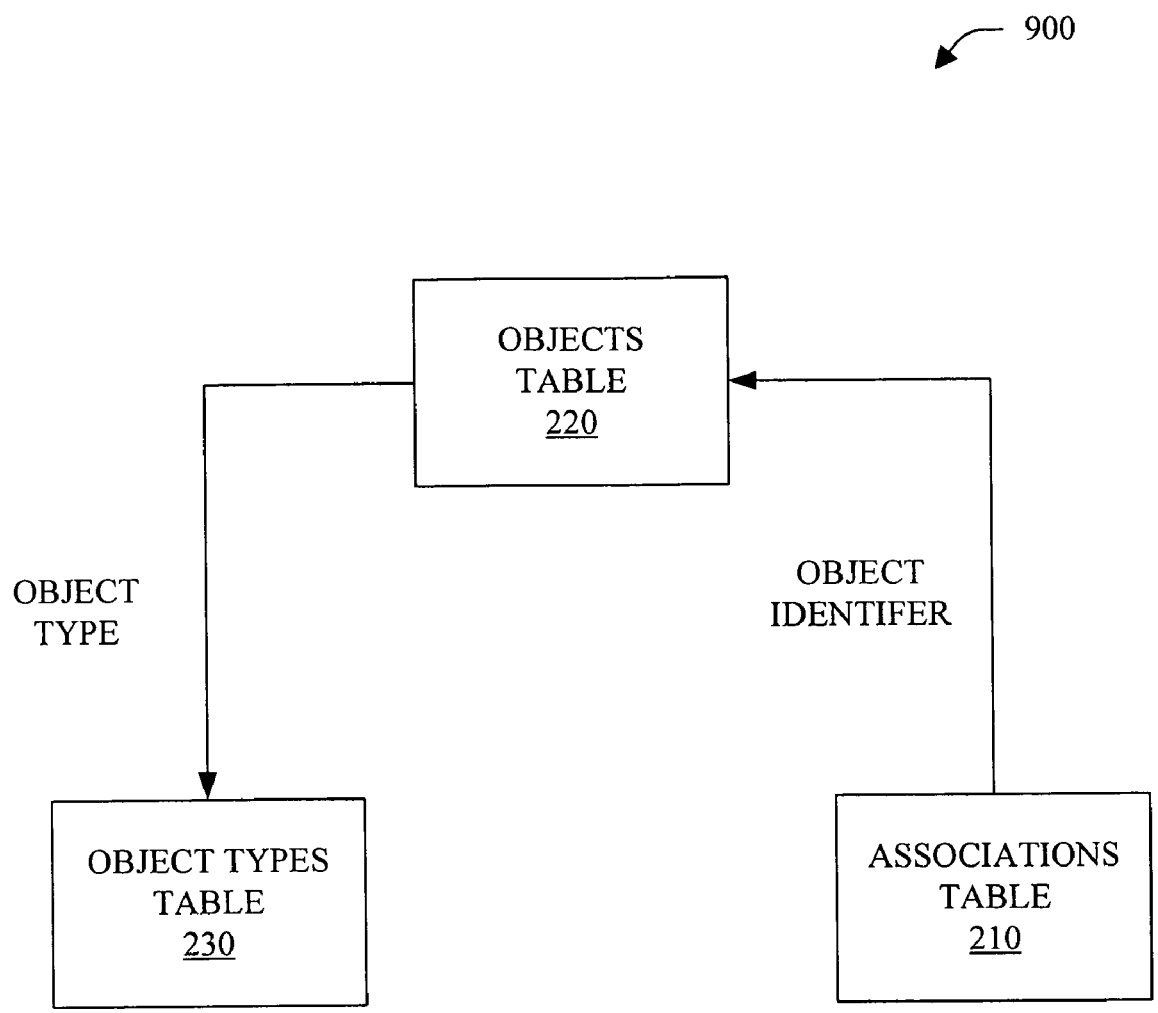
FIG. 9 is a diagram of an exemplary relationship in accordance with an aspect of the subject invention.

Next, referring to FIG. 9, an exemplary relationship diagram 900 in accordance with an aspect of the subject invention is illustrated. The diagram 900 illustrates the relationship between the three primary tables: associations table 210, objects table 220 and object types table 230. Object identifiers stored in entry(ies) of the associations table 210 refer to entry(ies) in the objects table 220 (e.g., obj1 410, obj2 420 and/or objA 430). Similarly, type identifiers in the objects table 220 refer to entry(ies) in the object types table 230 (e.g., type identifier 320).

It is to be appreciated that the system 100, the input component 110 and/or the schema generation component 120 can be computer components as that term is defined herein.

Figure 10:
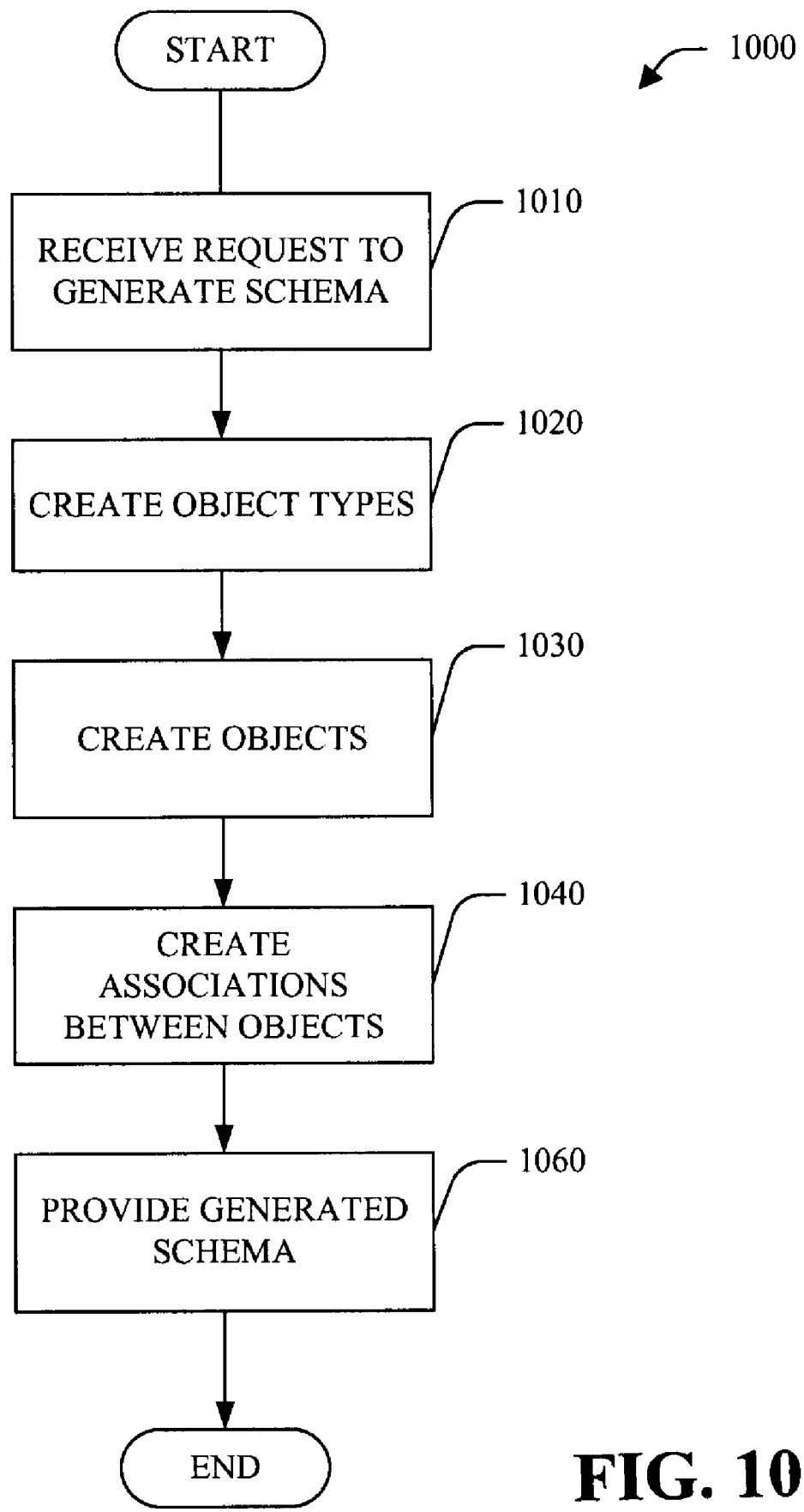
FIG. 10 is a flow chart of a method of generating a schema for a database in accordance with an aspect of the subject invention.

Turning briefly to FIG. 10, a methodology that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodology in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 10, a method of generating a schema for a database 1000 in accordance with an aspect of the subject invention is illustrated. At 1010, a request to generate a schema is received. For example, the request can include information associated with the requested schema including objects, associations between objects and types of objects. At 1020, object types are created, for example, by populating an object types table 230.

At 1030, objects are created, for example, by populating an objects table 220. Next, at 1040, associations between objects are created, for example, by populating an associations table 210. At 1060, the generated schema is provided, for example, to a requesting user.

Figure 11:
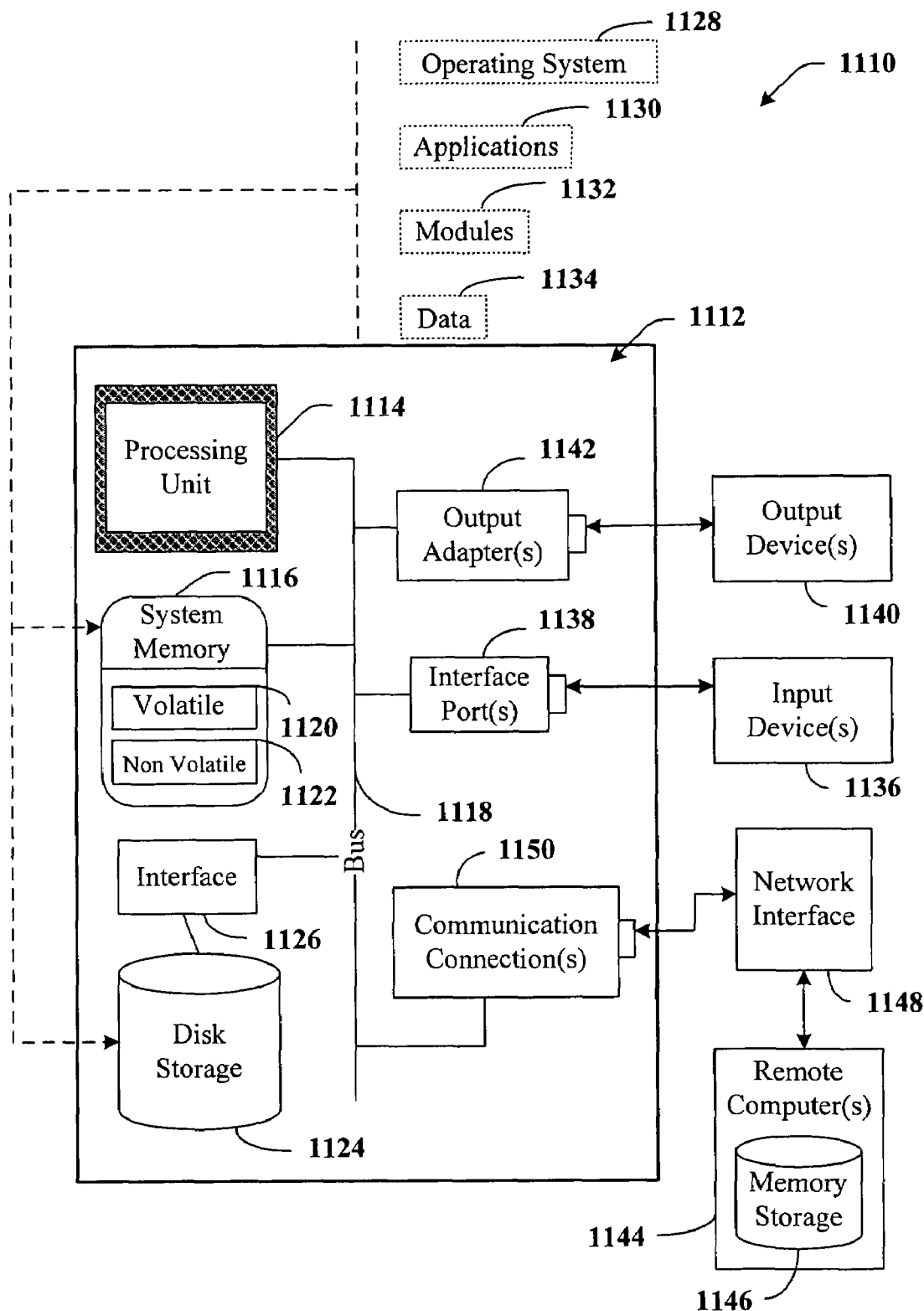
FIG. 11 illustrates an example operating environment in which the invention may function.

In order to provide additional context for various aspects of the subject invention, FIG. 11 and the following discussion are intended to provide a brief, general description of a suitable operating environment 1110 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the subject invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for generating a schema for a database, the system comprising a computer readable medium having stored thereon computer executable instructions for:
   causing a processing unit within a computer to read and write data to a storage memory within the computer, wherein the database is defined on the storage memory;
   operating an input component that receives information associated with the database; and,
   generating the schema, by operation of a schema generation component, wherein the generating is based, at least in part, upon information received by the input component, the schema further being based, at least in part, upon an associations table, an objects table and an object types table, wherein the generating comprises:
   receiving a request to generate a schema;
   extracting associations from the database using a file system engine;
   creating object types for population of the objects table;
   creating objects for population of the objects table;
   creating associations between objects by including the extracted associations in the associations table, wherein an entry of the associations table stores association information that links a first object with a second object;
   each entry in the associations table uniquely identifies an association between objects; and the system for generating the schema facilitates associations between objects with which a user interacts to create the schema during a database prototyping process; and modifying, in response to modifications to the database, entries to the associations table, the objects table and the objects type table to generate the schema dynamically.

2. The system of claim 1, wherein the generated schema facilitates identification of objects associated with a particular object.

3. The system of claim 1, wherein information associated with the first object and the second object is stored in the objects table.

4. The system of claim 1, wherein the association information comprises an association object.

5. The system of claim 4, wherein information associated with the association object is stored in the objects table.

6. The system of claim 1, wherein an entry of the objects table includes an object identifier and a type identifier.

7. The system of claim 6, wherein the type identifier refers to an entry in the objects type table.

8. The system of claim 1, wherein an entry of the objects table uniquely identifies an object.

9. The system of claim 1, wherein an entry of the object types table stores information associated with an object type.

10. The system of claim 1, wherein an entry of the object types table comprises a type identifier, a name and a description.

11. The system of claim 10, wherein the type identifier is associated with at least one of an association, a person, a file, an email, an application, a web page, a folder, an event, a raw event, a group type, a group and an email server.

12. The system of claim 10, wherein the entry further comprises information associated with a table associated with the type.

13. The system of claim 12, wherein the information associated with a table associated with the type comprises at least one of a raw event table, an event table and an object table.

14. The system of claim 1, wherein the generated schema is associated with a file system database.

15. The system of claim 1, wherein the generated schema is modified by the schema generation component based upon user interaction during prototyping.

16. A method of generating a schema for a database comprising:

causing a processing unit within a computer to read and write data to a storage memory within the computer, wherein a database is defined on the storage memory;

operating an input component that receives information associated with the database;

generating the schema, by operation of a schema generation component, wherein the generating is based, at least in part, upon information received by the input component, the schema further being based, at least in part, upon an associations table, an objects table and an object types table, wherein:

an entry of the associations table stores association information that links a first object with a second object;

each entry in the associations table uniquely identifies an association between objects; and the method for generating the schema facilitates associations between objects with which a user interacts to create the schema during a database prototyping process; and wherein the generating comprises:

receiving a request to generate a schema;

extracting associations from the database using a file system engine;

populating the object types table with types of objects;

populating the objects table with instances of the types of objects;

populating the associations table with information linking types of objects, wherein the information comprises the extracted associations; and dynamically modifying entries to the objects type table, the objects table and the associations table in response to changes to the database, wherein the modifying generates the schema dynamically in response to changes to the database.

17. The method of claim 16, additionally comprising providing the schema as output.

18. A schema generation system comprising:

means for causing a processing unit within a computer to read and write data to a storage memory within the computer, wherein a database is defined on the storage memory;

means for receiving information associated with a requested schema for the database; and, means for generating the requested schema, the schema based, at least in part, upon the received information and upon an associations table, an objects table and an object types table, wherein:

an entry of the associations table stores association information that links a first object with a second object;

each entry in the associations table uniquely identifies an association between objects; and the schema generation system facilitates associations between objects with which a user interacts to create the schema during a database prototyping process; and wherein the means for generating comprises:

means for receiving a request to generate a schema;

means for extracting associations from the database using a file system engine;

means for populating the object types table with types of objects;

means for populating the objects table with instances of the types of objects;

means for populating the associations table with information linking types of objects, wherein the information comprises the extracted associations; and means for dynamically modifying entries to the objects type table, the objects table and the associations table in response to the means for extracting associations from the database, wherein the modifying generates the schema dynamically in response to changes to the database.

* * * * *